(12) United States Patent
Kim et al.

(10) Patent No.: US 11,244,136 B2
(45) Date of Patent: Feb. 8, 2022

(54) DISPLAY APPARATUS AND A METHOD OF COMPENSATING FINGERPRINT SENSING DATA USING THE SAME

(71) Applicant: SAMSUNG DISPLAY CO., LTD., Yongin-si (KR)

(72) Inventors: Kee Yong Kim, Hwaseong-si (KR); Mun Su Kim, Hwaseong-si (KR); Chang Yeob Kim, Paju-si (KR); Jae-Sung Cha, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 15 days.

(21) Appl. No.: 16/929,221

(22) Filed: Jul. 15, 2020

(65) Prior Publication Data

US 2021/0097255 A1 Apr. 1, 2021

(30) Foreign Application Priority Data

Sep. 27, 2019 (KR) .......................... 10-2019-0119543

(51) Int. Cl.
*G06K 9/00* (2006.01)
(52) U.S. Cl.
CPC ................. *G06K 9/00013* (2013.01)

(58) Field of Classification Search
None
See application file for complete search history.

(56) References Cited

U.S. PATENT DOCUMENTS

| 2007/0297653 | A1* | 12/2007 | Bolle | G06K 9/00073 |
| | | | | 382/124 |
| 2016/0275334 | A1* | 9/2016 | Hama | G06F 21/32 |
| 2017/0185819 | A1* | 6/2017 | Pang | G06K 9/00013 |
| 2017/0316248 | A1* | 11/2017 | He | G06K 9/00013 |

FOREIGN PATENT DOCUMENTS

| KR | 101857933 | 5/2018 |
| KR | 101928319 | 12/2018 |

* cited by examiner

*Primary Examiner* — Nicholas J Lee
(74) *Attorney, Agent, or Firm* — F. Chau & Associates, LLC

(57) ABSTRACT

A display apparatus includes: a display panel configured to display an image; a fingerprint sensor disposed on the display panel and configured to capture a fingerprint image and to generate fingerprint sensing data; and a fingerprint sensor controller configured to generate a compensation characteristic function of each pixel of the fingerprint sensor using a plurality of test patterns, to extract a coefficient of the compensation characteristic function of each pixel and to compensate the fingerprint sensing data using the coefficient of the compensation characteristic function.

20 Claims, 21 Drawing Sheets

FIG. 17

| P1 | CAL_DATA_1 | CAL_DATA_2 | ... | CAL_DATA_n-1 | CAL_DATA_n |
|----|------------|------------|-----|--------------|------------|
| P2 | CAL_DATA_1 | CAL_DATA_2 | ... | CAL_DATA_n-1 | CAL_DATA_n |
| P3 | CAL_DATA_1 | CAL_DATA_2 | ... | CAL_DATA_n-1 | CAL_DATA_n |
| ⋮ | ⋮ | ⋮ | ⋮ | ⋮ | ⋮ |
| PM | CAL_DATA_1 | CAL_DATA_2 | ... | CAL_DATA_n-1 | CAL_DATA_n |

FIG. 22
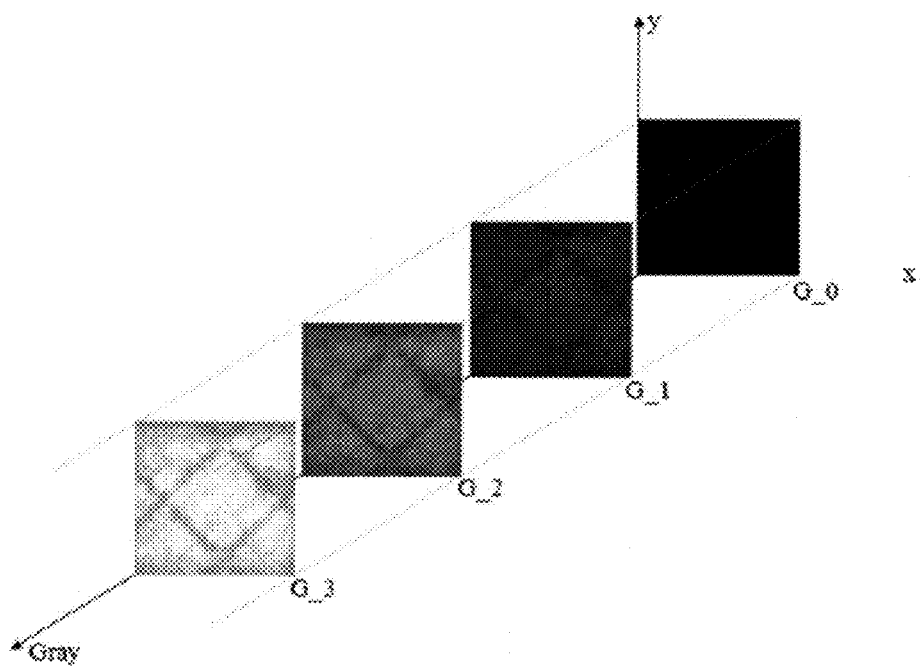
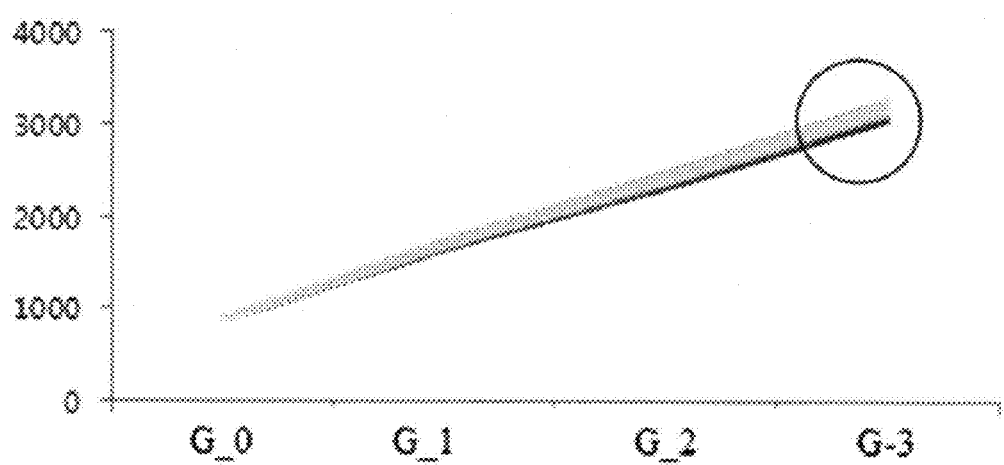

FIG. 23
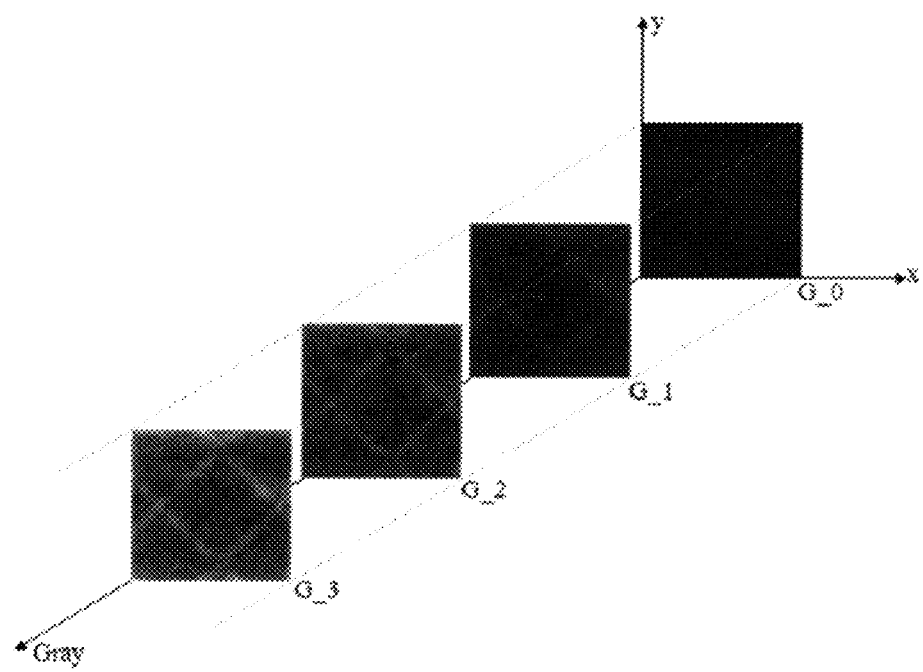
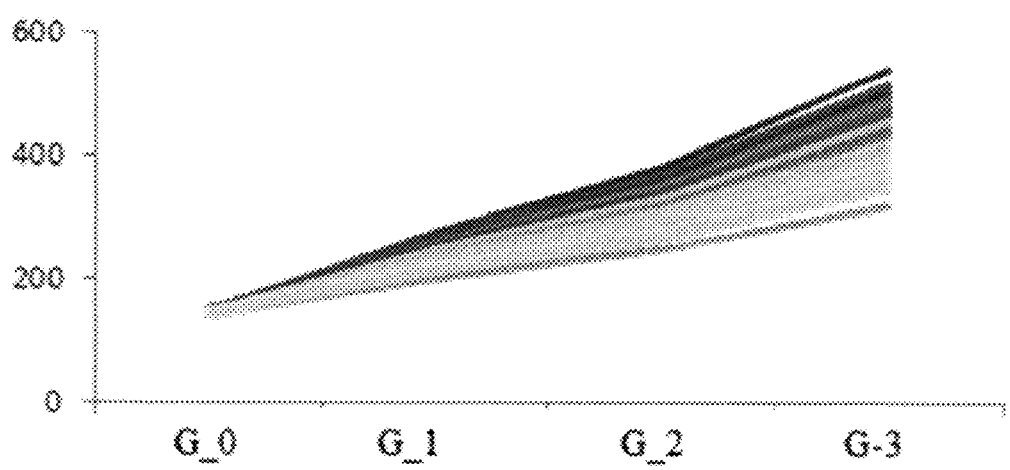

FIG. 24
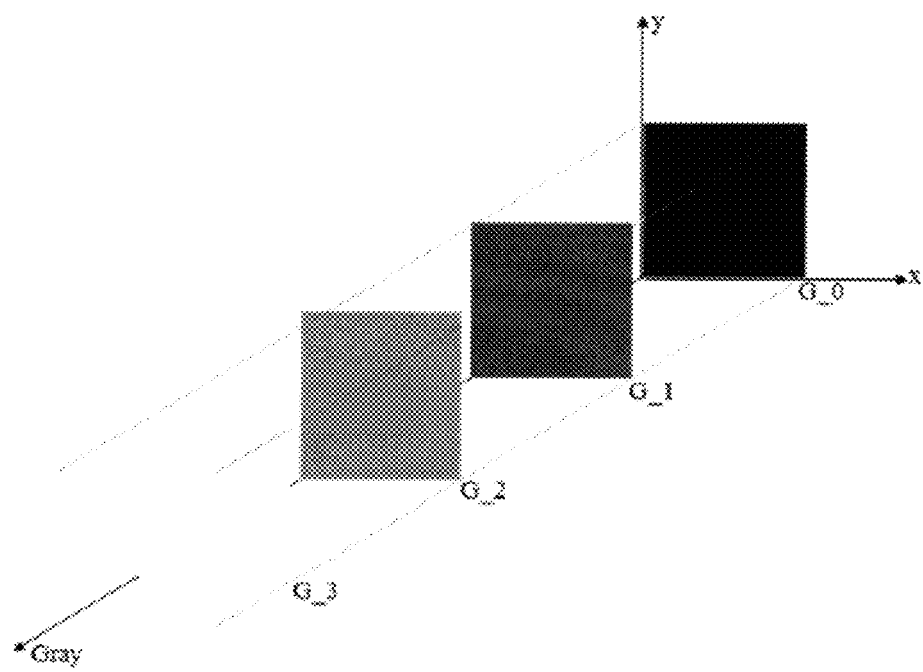
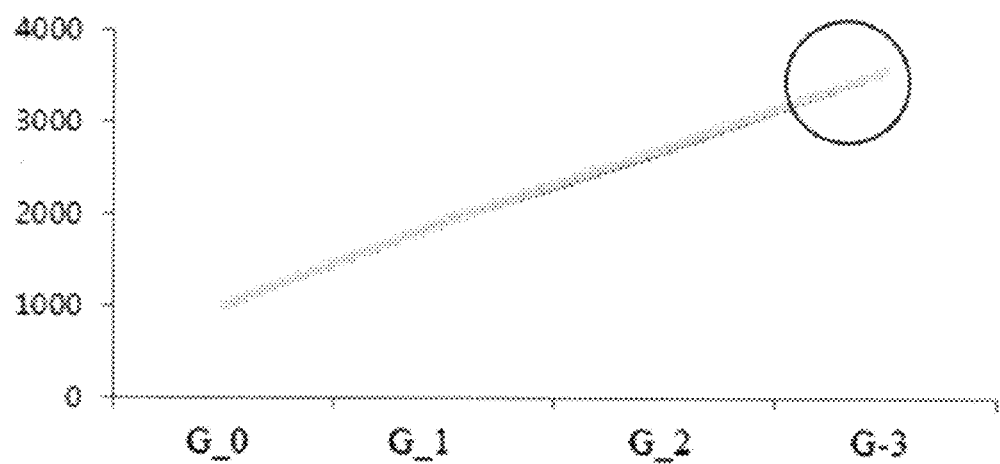

FIG. 25

| P1 | AVG(AC1~ACM)-AC1 | AVG(BC1~BCM)-BC1 |
|----|------------------|------------------|
| P2 | AVG(AC1~ACM)-AC2 | AVG(BC1~BCM)-BC2 |
| P3 | AVG(AC1~ACM)-AC3 | AVG(BC1~BCM)-BC3 |
| ⋮  | ⋮                | ⋮                |
| PM | AVG(AC1~ACM)-ACM | AVG(BC1~BCM)-BCM |

FIG. 26

| P1 | AVG(AC1~ACM)-AC1 | AVG(BC1~BCM)-BC1 | AVG(CC1~CCM)-CC1 |
|---|---|---|---|
| P2 | AVG(AC1~ACM)-AC2 | AVG(BC1~BCM)-BC2 | AVG(CC1~CCM)-CC2 |
| P3 | AVG(AC1~ACM)-AC3 | AVG(BC1~BCM)-BC3 | AVG(CC1~CCM)-CC3 |
| ⋮ | ⋮ | ⋮ | ⋮ |
| PM | AVG(AC1~ACM)-ACM | AVG(BC1~BCM)-BCM | AVG(CC1~CCM)-CCM |

DISPLAY APPARATUS AND A METHOD OF COMPENSATING FINGERPRINT SENSING DATA USING THE SAME

CROSS-REFERENCE TO RELATED APPLICATION(S)

This application claims priority under 35 U.S.C. § 119 to Korean Patent Application No. 10-2019-0119543, filed on Sep. 27, 2019 in the Korean Intellectual Property Office (KIPO), the disclosure of which is incorporated by reference herein in its entirety.

TECHNICAL FIELD

Exemplary embodiments of the present inventive concept relate to a display apparatus and a method of compensating fingerprint sensing data using the display apparatus. More particularly, exemplary embodiments of the present inventive concept relate to a display apparatus including a fingerprint sensor and a method of compensating fingerprint sensing data using the display apparatus and a compensation function.

DISCUSSION OF THE RELATED ART

Fingerprint recognition devices is one of biometric technologies being widely researched because fingerprint recognition devices are easy to use while providing high security. Recently, the research for fingerprint recognition devices has been conducted to provide devices that are highly reliable at recognizing a user's input of a fingerprint image and making a final determination as to the user's input.

Generally, a fingerprint sensor module acquires the fingerprint image, by using an image capture device, and compares a previously stored fingerprint image with a new input fingerprint image to make the final determination.

When the fingerprint image acquired by the fingerprint sensor module is distorted by a noise component, the accuracy of the final determination may be reduced. To remove the noise component and enhance the sensor characteristic variation, compensation data may be generated using a plurality of test patients. When the number of the test patterns is increased to enhance the reliability of the fingerprint recognition, a capacity of a memory for storing the compensation data may increase. In addition, when the number of the test patterns is increased, an amount of the compensation data may increase.

SUMMARY

According to an exemplary embodiment of the present inventive concept, a display apparatus includes: a display panel configured to display an image; a fingerprint sensor disposed on the display panel and configured to capture a fingerprint image and to generate fingerprint sensing data; and a fingerprint sensor controller configured to generate a compensation characteristic function of each pixel of the fingerprint sensor using a plurality of test patterns, to extract a coefficient of the compensation characteristic function of each pixel and to compensate the fingerprint sensing data using the coefficient of the compensation characteristic function.

In an exemplary embodiment of the present inventive concept, the display apparatus further includes a memory configured to store information including the coefficient of the compensation characteristic function of each pixel.

In an exemplary embodiment of the present inventive concept, as a number of the test patterns used increases, an amount of the information stored in memory does not increase.

In an exemplary embodiment of the present inventive concept, a number of the test patterns is equal to or greater than a degree of the compensation characteristic function.

In an exemplary embodiment of the present inventive concept, the memory is configured to store a coefficient compensation value of each pixel of the fingerprint sensor, wherein a coefficient compensation value of a first pixel of the fingerprint sensor is determined by subtracting a coefficient of the compensation characteristic function of the first pixel from an average of coefficients of the compensation characteristic functions of all of the pixels of the fingerprint sensor.

In an exemplary embodiment of the present inventive concept, the fingerprint sensor controller is configured to generate a first characteristic function of measured fingerprint sensing data, to generate a second characteristic function by adding the coefficient compensation value of each pixel to the coefficient of the first characteristic function and to obtain compensated fingerprint sensing data using the second characteristic function, wherein the fingerprint sensing data is measured by the fingerprint sensor.

In an exemplary embodiment of the present inventive concept, the compensation characteristic function has a form of $y=Ax+B$.

In an exemplary embodiment of the present inventive concept, a first coefficient compensation value of the first pixel of the fingerprint sensor is determined by subtracting "A" of the first pixel from an average value of "A" of all of the pixels of the fingerprint sensor, wherein a second coefficient compensation value of the first pixel is determined by subtracting "B" of the first pixel from an average value of "B" of all of the pixels of the fingerprint sensor, and wherein the memory is configured to store the first coefficient compensation values of all of the pixels of the fingerprint sensor and the second coefficient compensation values of all of the pixels of the fingerprint sensor.

In an exemplary embodiment of the present inventive concept, a number of the pixels of the fingerprint sensor is M, and a number of the coefficient compensation values is 2M, wherein the number of the coefficient compensation values is independent from a number of the test patterns.

In an exemplary embodiment of the present inventive concept, the compensation characteristic function has a form of $y=Ax2+Bx+C$.

In an exemplary embodiment of the present inventive concept, a first coefficient compensation value of the first pixel of the fingerprint sensor is determined by subtracting "A" of the first pixel from an average value of "A" of all of the pixels of the fingerprint sensor, wherein a second coefficient compensation value of the first pixel is determined by subtracting "B" of the first pixel from an average value of "B" of all of the pixels of the fingerprint sensor, wherein a third coefficient compensation value of the first pixel is determined by subtracting "C" of the first pixel from an average value of "C" of all of the pixels of the fingerprint sensor, and wherein the memory is configured to store the first coefficient compensation values of all of the pixels of the fingerprint sensor, the second coefficient compensation values of all of the pixels of the fingerprint sensor and the third coefficient compensation values of all of the pixels of the fingerprint sensor.

In an exemplary embodiment of the present inventive concept, a number of the pixels of the fingerprint sensor is M, and a number of the coefficient compensation values is 3M, wherein the number of the coefficient compensation values is independent front a number of the test patterns.

According to an exemplary embodiment of the present inventive concept, a method of compensating fingerprint sensing data includes capturing a plurality of test patterns using a fingerprint sensor, wherein the plurality of test patterns are used to generate test sensing data; generating a compensation characteristic function of each pixel of the fingerprint sensor using the test sensing data; extracting a coefficient of the compensation characteristic function; capturing a plurality of fingerprint images using the fingerprint sensor, wherein the plurality of fingerprint images are used to generate fingerprint sensing data; and compensating the fingerprint sensing data using the coefficient of the compensation characteristic function.

In an exemplary embodiment of the present inventive concept, the method further includes storing information including the coefficient of the compensation characteristic function in a memory.

In an exemplary embodiment of the present inventive concept, as a number of the test patterns used increases, an amount of the information stored in the memory does not increase.

In an exemplary embodiment of the present inventive concept, a number of the test patterns is equal to or greater than a degree of the compensation characteristic function.

In an exemplary embodiment of the present inventive concept, the memory is configured to store a coefficient compensation value of each pixel of the fingerprint sensor, wherein a coefficient compensation value of a first pixel of the fingerprint sensor is determined by subtracting a coefficient of the compensation characteristic function of the first pixel front an average of coefficients of the compensation characteristic functions of all of the pixels of the fingerprint sensor.

In an exemplary embodiment of the present inventive concept, compensating the fingerprint sensing data includes generating a first characteristic function of measured fingerprint sensing data, wherein the fingerprint sensing data is measured by the fingerprint sensor; generating a second characteristic function by adding the coefficient compensation value of each pixel to the coefficient of the first characteristic function, and obtaining compensated fingerprint sensing data using the second characteristic function.

In an exemplary embodiment of the present inventive concept, the compensation characteristic function has a form of $y=Ax+B$.

In an exemplary embodiment of the present inventive concept, a first coefficient compensation value of the first pixel of the fingerprint sensor is determined by subtracting "A" of the first pixel from an average value of "A" of all of the pixels of the fingerprint sensor, wherein a second coefficient compensation value of the first pixel is determined by subtracting "B" of the first pixel from an average value of "B" of all of the pixels of the fingerprint sensor, and wherein the memory is configured to store the first coefficient compensation values of all of the pixels of the fingerprint sensor and the second coefficient compensation values of all of the pixels of the fingerprint sensor.

BRIEF DESCRIPTION OF THE DRAWINGS

The above and other features of the present inventive concept will become more apparent by describing in detail exemplary embodiments thereof with reference to the accompanying drawings, in which:

FIG. 17 illustrates a lookup table storing an image compensation value according to the comparative example of FIG. 7;

FIG. 22 illustrates a characteristic function of the fingerprint sensor of FIG. 3 with four test patterns according to an exemplary embodiment of the present inventive concept;

FIG. 23 illustrates a compensation characteristic function of the fingerprint sensor of FIG. 3 with four test patterns according to an exemplary embodiment of the present inventive concept;

FIG. 24 illustrates a compensated characteristic function of the fingerprint sensor of FIG. 3 with four test patterns according to an exemplary embodiment of the present inventive concept;

FIG. 25 illustrates an example of a lookup table storing a coefficient compensation value stored in a memory of FIG. 3 according to an exemplary embodiment of the present inventive concept; and FIG. 26 illustrates an example of a lookup table storing a coefficient compensation value stored in a memory of a display apparatus according to an exemplary embodiment of the present inventive concept.

DETAILED DESCRIPTION OF THE EMBODIMENTS

Exemplary embodiments of the present inventive concept provide a display apparatus that may reduce manufacturing costs and increase productivity of the display apparatus by not having to increase a capacity of a memory of the display apparatus.

Exemplary embodiments of the present inventive concept also provide a method of compensating fingerprint sensing data using the display apparatus.

Hereinafter, exemplary embodiments of the present inventive concept will be explained in detail with reference to the accompanying drawings.

Figure 1:
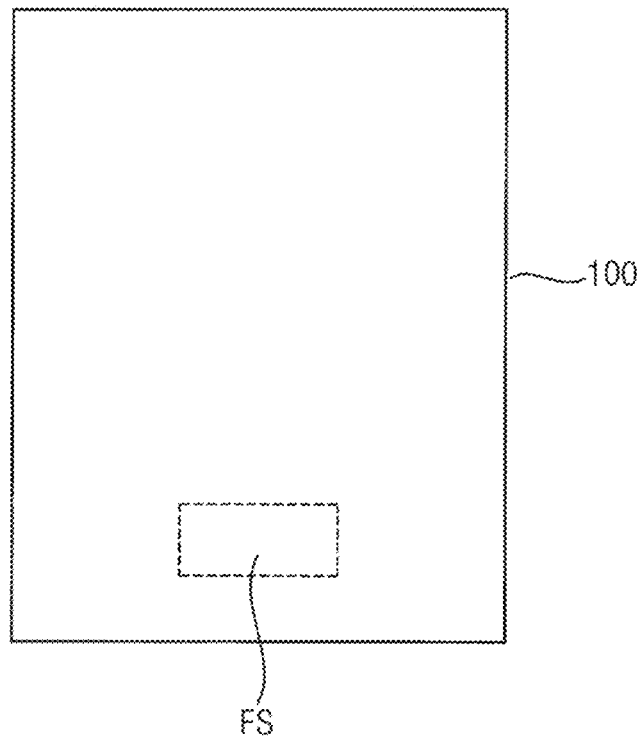
FIG. 1 is a plan view illustrating a display panel and a fingerprint sensor of a display apparatus according to an exemplary embodiment of the present inventive concept.
Figure 2:
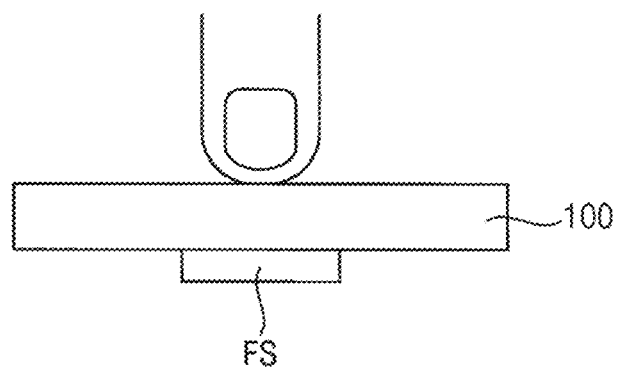
FIG. 2 is a cross-sectional view illustrating the display panel and the fingerprint sensor of FIG. 1.

FIG. 1 is a plan view illustrating a display panel 100 and a fingerprint sensor FS of a display apparatus according to an exemplary embodiment of the present inventive concept. FIG. 2 is a cross-sectional view illustrating the display panel 100 and the fingerprint sensor FS of FIG. 1.

Referring to FIGS. 1 and 2, the display apparatus includes the display panel 100 and the fingerprint sensor FS. The display panel 100 may include a display region and peripheral region at least partially surrounding the display region.

The fingerprint sensor FS may be overlapped with the display panel 100. For example, the fingerprint sensor FS may overlap the display region of the display panel 100. As an additional example, the fingerprint sensor FS may be disposed under the display panel 100. For example, the fingerprint sensor FS may be an image sensor. The fingerprint sensor FS may capture a fingerprint image of a user's fingerprint pressed on the display panel 100 to generate fingerprint sensing data.

Figure 3:
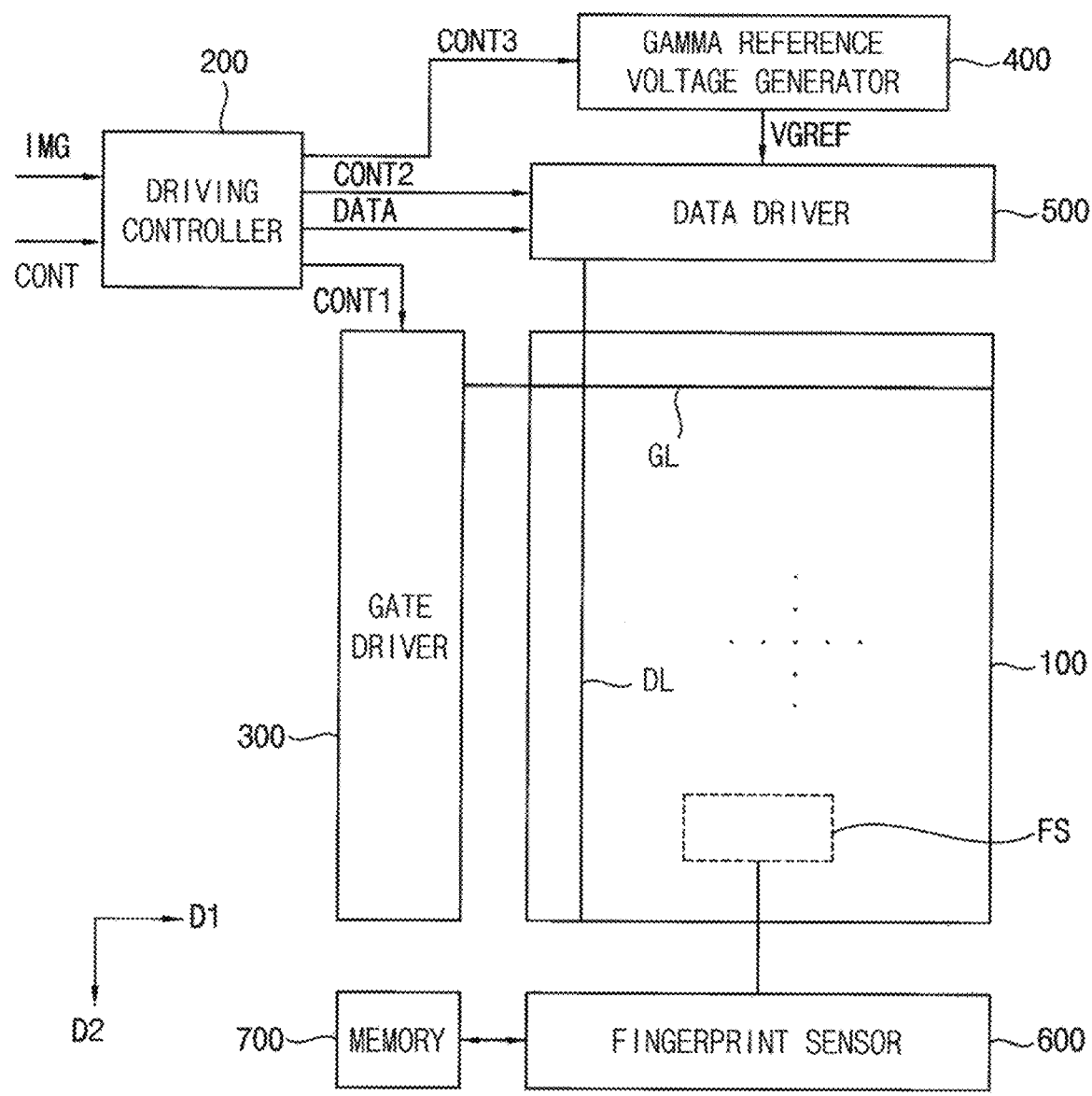
FIG. 3 is a block diagram illustrating the display apparatus of FIG. 1.

FIG. 3 is a block diagram illustrating the display apparatus of FIG. 1.

Referring to FIGS. 1 to 3, the display apparatus includes a display panel 100 and a display panel driver. The display panel driver includes a driving controller 200, a gate driver 300, a gamma reference voltage generator 400 and a data driver 500. The display apparatus may further include the fingerprint sensor FS and a fingerprint sensor controller 600. The display apparatus may further include a memory 700.

The driving controller 200 may be connected to the data driver 500. For example, the driving controller 200 and the data driver 500 may be integrally formed. The driving controller 200, the gamma reference voltage generator 400 and the data driver 500 may be connected to each other. For example, the driving controller 200, the gamma reference voltage generator 400 and the data driver 500 may be integrally formed. A driving module including at least the driving controller 200 and the data driver 500 which are integrally formed may be called to a timing controller embedded data driver (TED).

The display panel driver may further include an emission driver outputting an emission signal to the display panel 100. The display panel driver may further include a power voltage generator providing a power voltage to at least one of the display panel 100, the driving controller 200, the gate driver 300, the gamma reference voltage generator 400 or the data driver 500.

The display panel 100 has the display region on which an image is displayed and a peripheral region adjacent to the display region. For example, the peripheral may at least partially surround the display region.

The display panel 100 includes a plurality of gate lines GL, a plurality of data lines DL and a plurality of pixels connected to the gate lines GL and the data lines DL. The gate lines GL extend in a first direction D1 and the data lines DL extend in a second direction D2 crossing the first direction D1.

The driving controller 200 receives input image data IMG and an input control signal CONT from an external apparatus. The input image data IMG may include red image data, green image data and blue image data. The input image data IMG may include white image data. For example, the input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

For example, the driving controller 200 generates the first control signal CONT1 for controlling an operation of the gate driver 300 based on the input control signal CONT, and outputs the first control signal CONT1 to the gate driver 300. For example, the first control signal CONT1 may further include a vertical start signal and a gate clock signal.

For example, the driving controller 200 generates the second control signal CONT2 for controlling an operation of the data driver 500 based on the input control signal CONT, and outputs the second control signal CONT2 to the data driver 500. For example, the second control signal CONT2 may include a horizontal start signal and a load signal.

For example, the driving controller 200 generates the data signal DATA based on the input image data IMG. The driving controller 200 outputs the data signal DATA to the data driver 500.

For example, the driving controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals for driving the gate lines GL in response to the first control signal CONT1 received from the driving controller 200. The gate driver 300 outputs the gate signals to the gate lines GL based on the first control signal CONT1. For example, the gate driver 300 may sequentially output the gate signals to the gate lines GL. For example, the gate driver 300 may be mounted on the peripheral region of the display panel 100. For example, the gate driver 300 may be integrated on the peripheral region of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500 based on the third control signal CONT3. For example, the gamma reference voltage VGREF has a value corresponding to a level of the data signal DATA.

In an exemplary embodiment of the present inventive concept, the gamma reference voltage generator 400 may be disposed in the driving controller 200, or in the data driver 500. However, the present inventive concept is not limited thereto. For example, the gamma reference voltage generator 400 may be separate from the driving controller 200 and the data driver 500 and may be disposed in the peripheral region of the display panel 100.

The data driver 500 receives the second control signal CONT2 and the data signal DATA from the driving controller 200, and the data driver 500 receives the gamma reference voltages VGREF from the gamma reference voltage generator 400. The data driver 500 converts the data signal DATA into data voltages having an analog type by using the received gamma reference voltages VGREF. The data driver 500 outputs the data voltages to the data lines DL.

The fingerprint sensor FS may be disposed on the display panel 100. For example, the fingerprint sensor FS may be disposed under the display panel 100. The fingerprint sensor FS may capture the fingerprint image of a user's fingerprinted provided on the display panel 100 to generate the fingerprint sensing data. The fingerprint sensor FS may capture the fingerprint image through the display panel 100, and the fingerprint sensing data, of the captured fingerprint image, generated by the fingerprint sensor FS may require a compensation.

The fingerprint sensor controller 600 may generate a compensation characteristic function of each pixel of the fingerprint sensor FS using a plurality of test patterns. The fingerprint sensor controller 600 may extract a coefficient of the compensation characteristic function. The fingerprint sensor controller 600 may compensate the fingerprint sensing data using the coefficient of the compensation characteristic function. In an exemplary embodiment of the present inventive concept, the fingerprint sensor controller 600 may include a processor.

The memory 700 may include compensation information compensating the fingerprint sensing data. For example, the memory 700 may store information regarding the coefficient of the compensation characteristic function.

Figure 4:
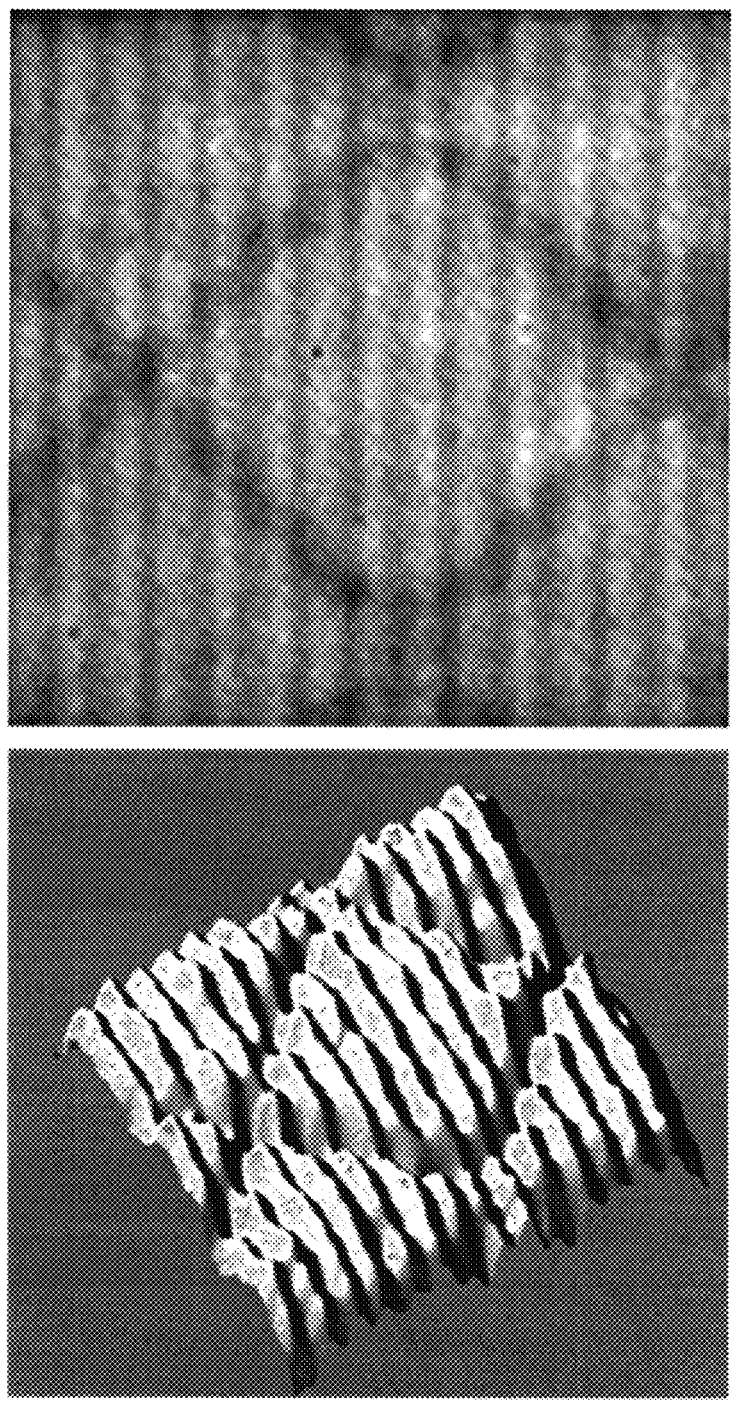
FIG. 4 illustrates fingerprint sensing data of a fingerprint sensor of FIG. 1 when the fingerprint sensing data are not compensated.
Figure 5:
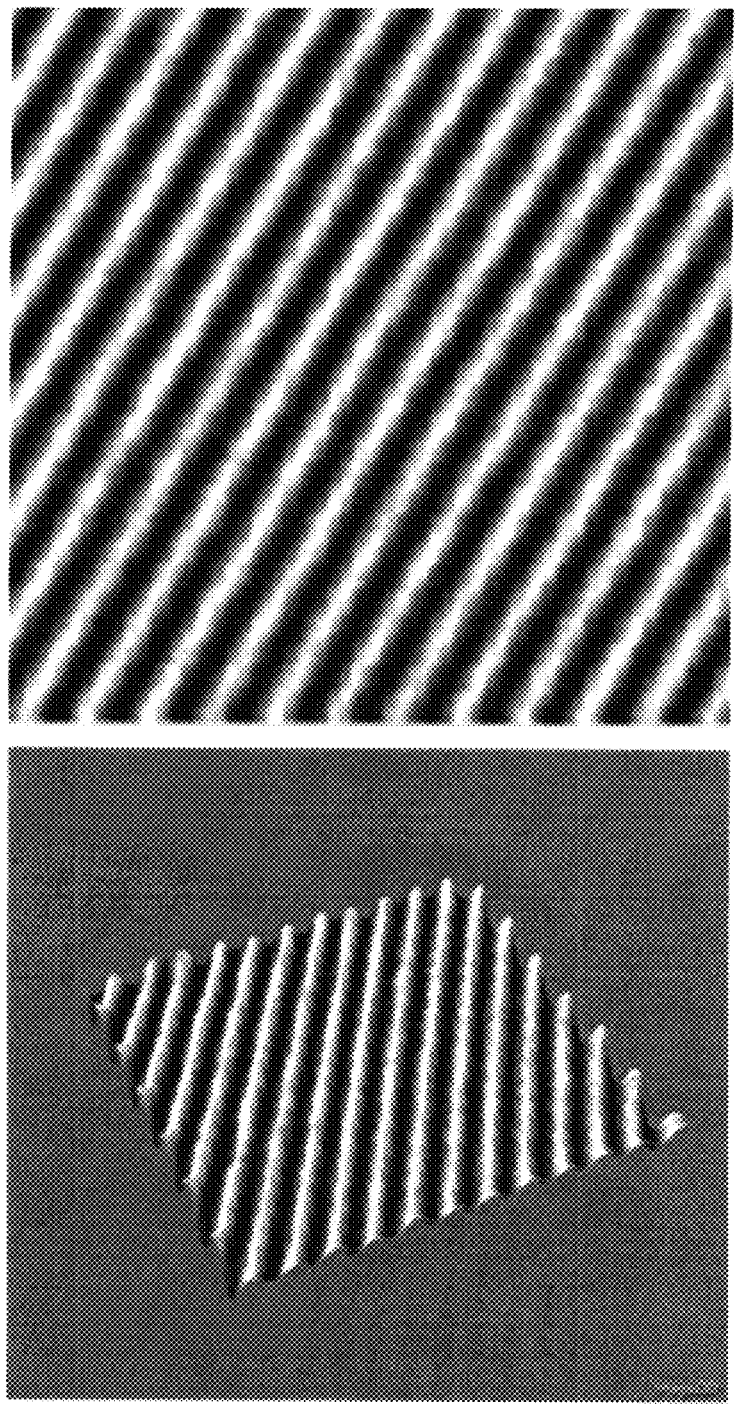
FIG. 5 illustrates Fingerprint sensing data of the fingerprint sensor of FIG. 1 when the fingerprint sensing data are normally compensated.
Figure 6:
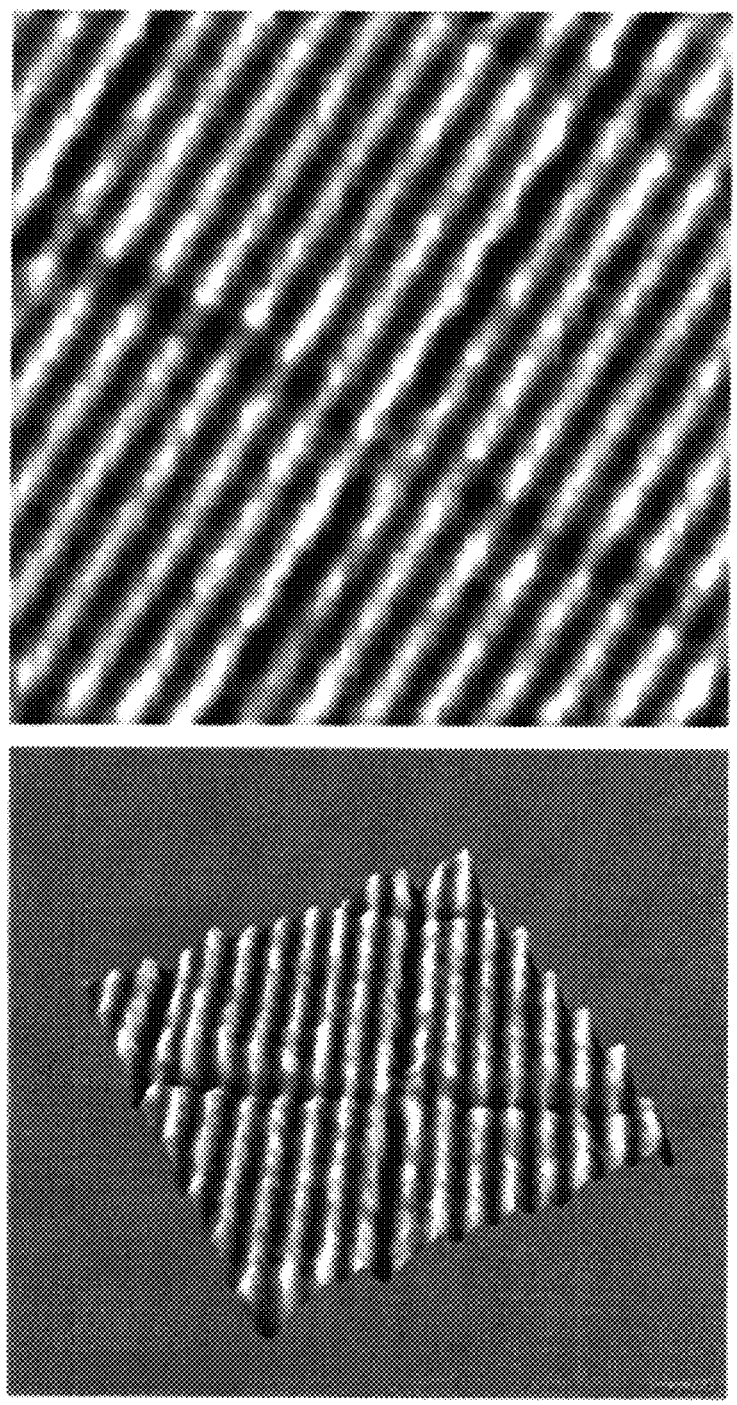
FIG. 6 illustrates fingerprint sensing data of the fingerprint sensor of FIG. 1 when the fingerprint sensing data are abnormally compensated.

FIG. 4 illustrates fingerprint sensing data of the fingerprint sensor FS of FIG. 1 when the fingerprint sensing data are not compensated. FIG. 5 illustrates fingerprint sensing data of the fingerprint sensor FS of FIG. 1 when the fingerprint sensing data are normally compensated. FIG. 6 illustrates fingerprint sensing data of the fingerprint sensor FS of FIG. 1 when the fingerprint sensing data are abnormally compensated.

Referring to FIG. 4, the fingerprint sensor FS may include a plurality of pixels. A non-uniformity of the fingerprint sensing data and a distortion of the fingerprint sensing data may be generated due to a characteristic variation of the pixels of the fingerprint sensor FS. For example, the fingerprint sensing data may be distorted by a touch electrode of the display panel 100. For example, the touch electrode may be disposed on the display panel 100. In addition, the touch electrode may be disposed on a touch panel disposed on the display panel 100 and independently formed from the display panel 100.

To compensate the non-uniformity of the fingerprint sensing data and the distortion of the fingerprint sensing data, compensation data compensating the fingerprint sensing data may be generated and stored in the memory 700.

When the fingerprint sensor FS operates, the fingerprint sensor controller 600 may compensate the fingerprint sensing data using the compensation data stored in the memory 700.

In FIG. 4, the fingerprint sensing data are not compensated, so that a stripe pattern may not be accurately recognized by the fingerprint sensor FS, but a pattern including a distorted image of a rhombus shape may be recognized when the stripe pattern is applied to the fingerprint sensor FS. For example, the touch electrode of the display panel 100 may have the rhombus shape.

In FIG. 5, the fingerprint sensing data are normally compensated, so that the stripe pattern may be accurately recognized when the stripe pattern is applied to the fingerprint sensor FS.

In FIG. 6, the fingerprint sensing data is abnormally compensated, so that the pattern including the stripe pattern and a distorted image including a weak (e.g., having low visibility) rhombus pattern may be recognized when the stripe pattern is applied to the fingerprint sensor FS.

When the fingerprint sensing data is normally compensated as shown in FIG. 5, a fingerprint image of a user may be accurately recognized.

For example, when the fingerprint sensing data are not compensated or are abnormally compensated as shown in FIG. 4 or 6, an accuracy of the recognition of the fingerprint image of the user may be reduced.

Figure 7:
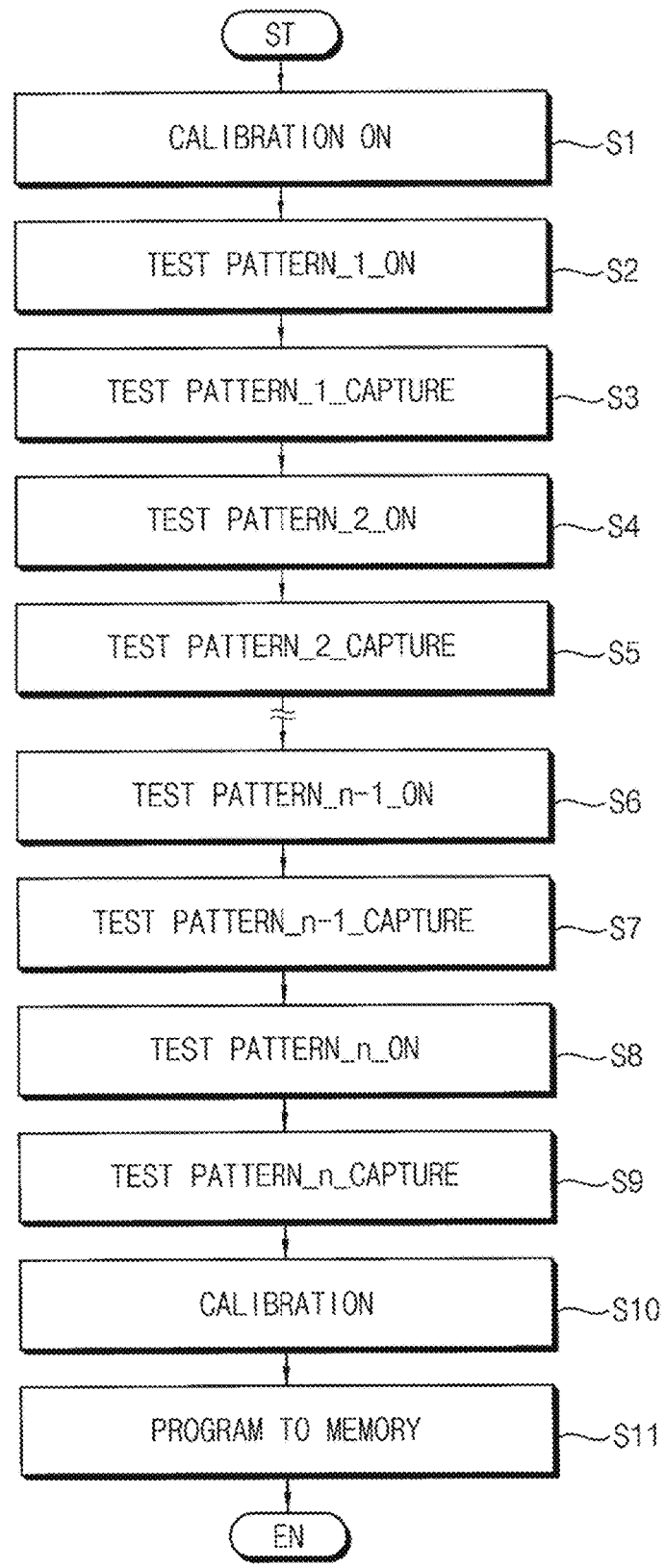
FIG. 7 is a flowchart diagram illustrating a method of compensating fingerprint sensing data according to a comparative example.
Figure 8:
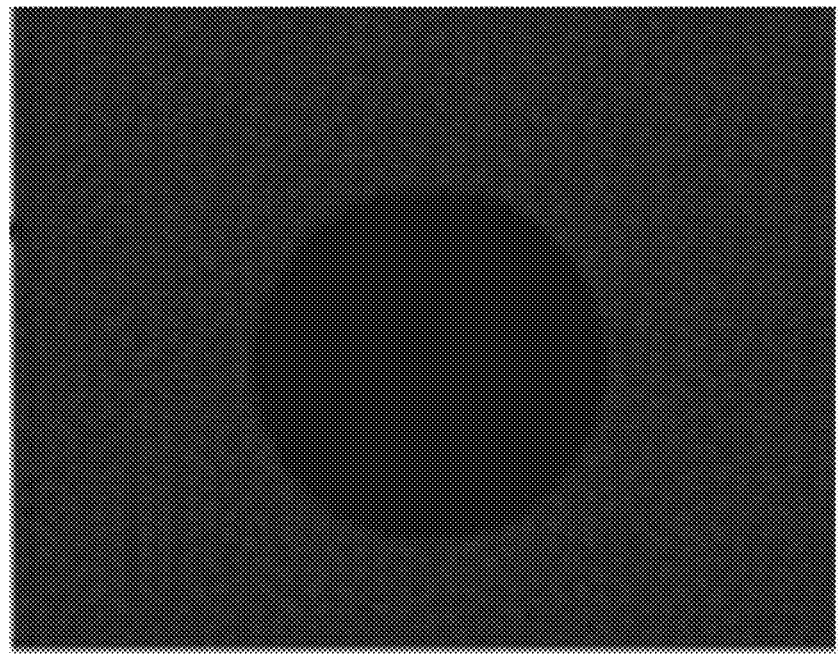
FIG. 8 illustrates a first test pattern to compensate the fingerprint sensing data according to the comparative example of FIG. 7.
Figure 9:
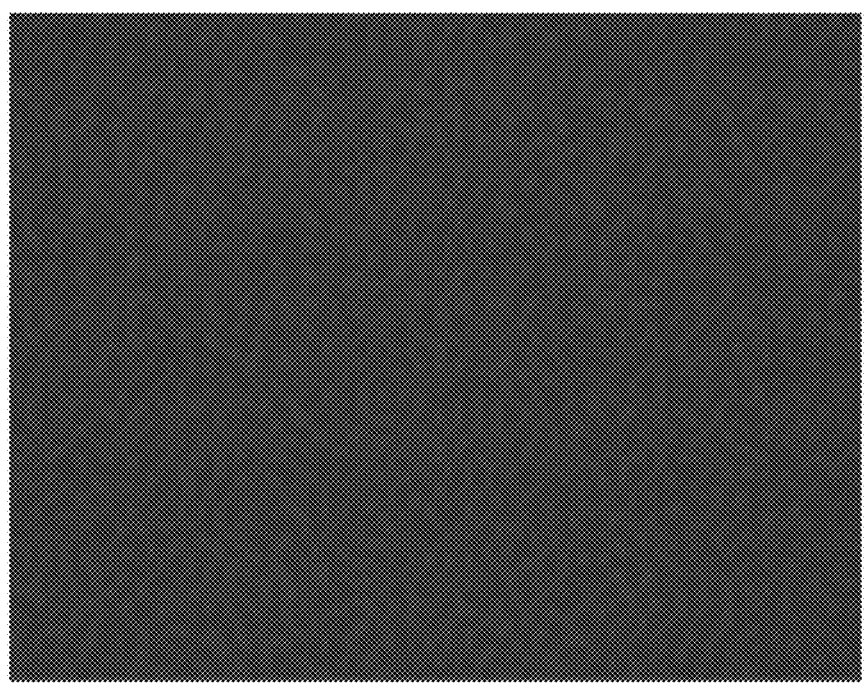
FIG. 9 illustrates first test sensing data generated by capturing the first test pattern of FIG. 8.
Figure 10:
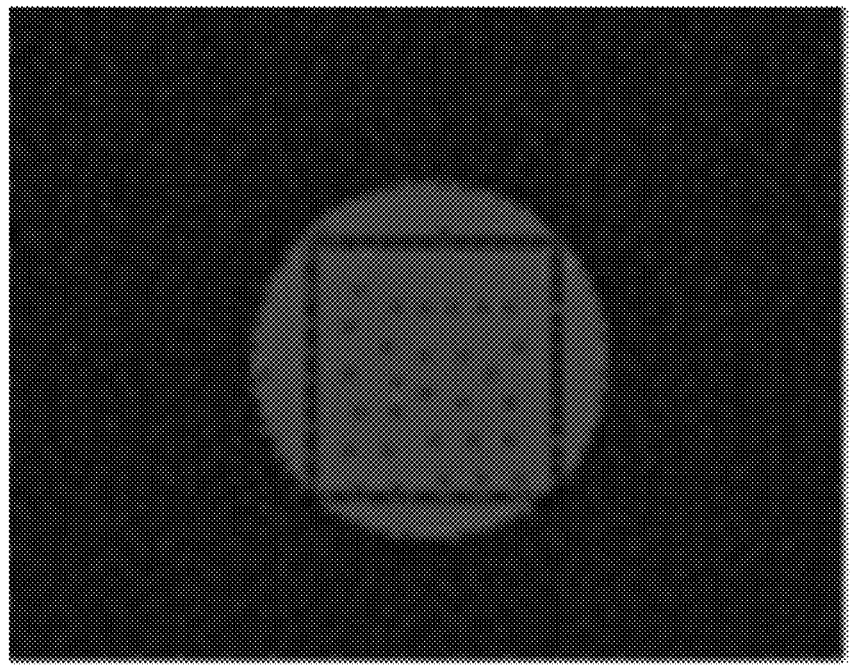
FIG. 10 illustrates a second test pattern to compensate the fingerprint sensing data according to the comparative example of FIG. 7.
Figure 11:
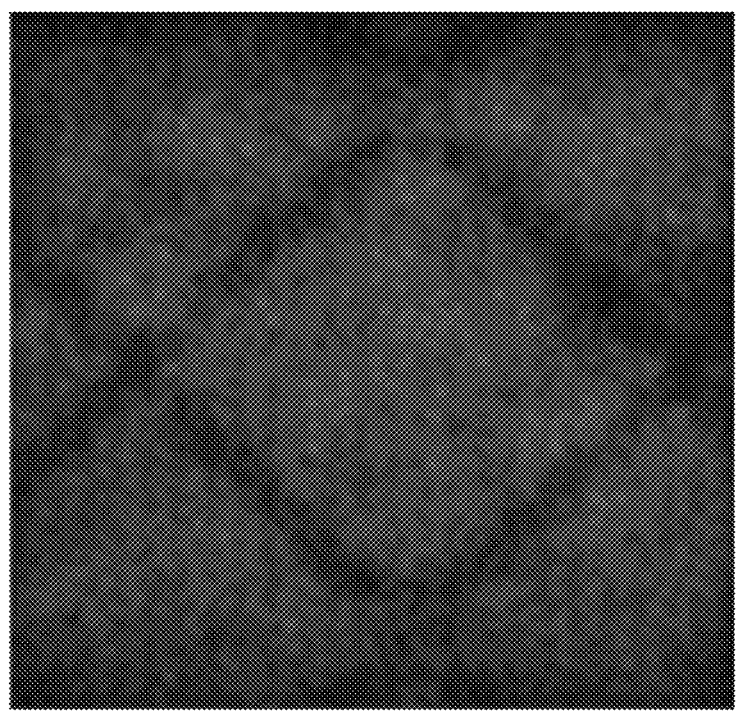
FIG. 11 illustrates second test sensing data generated by capturing the second test pattern of FIG. 10.
Figure 12:
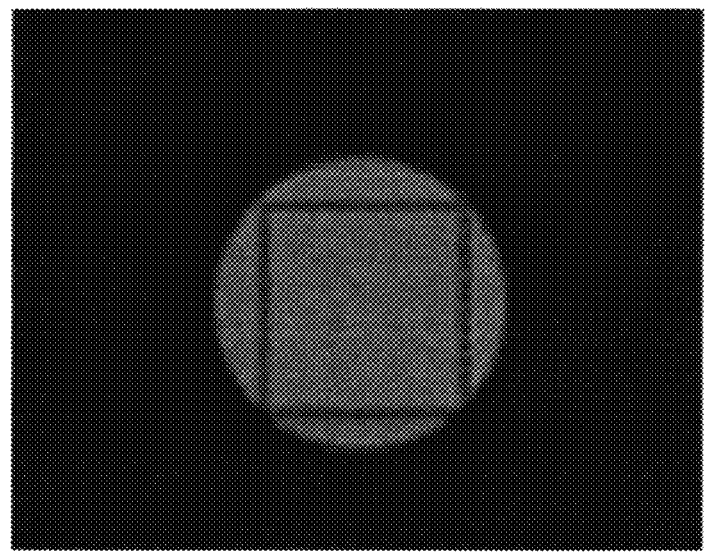
FIG. 12 illustrates an (N−1)-th test pattern to compensate the fingerprint sensing data according to the comparative example of FIG. 7.
Figure 13:
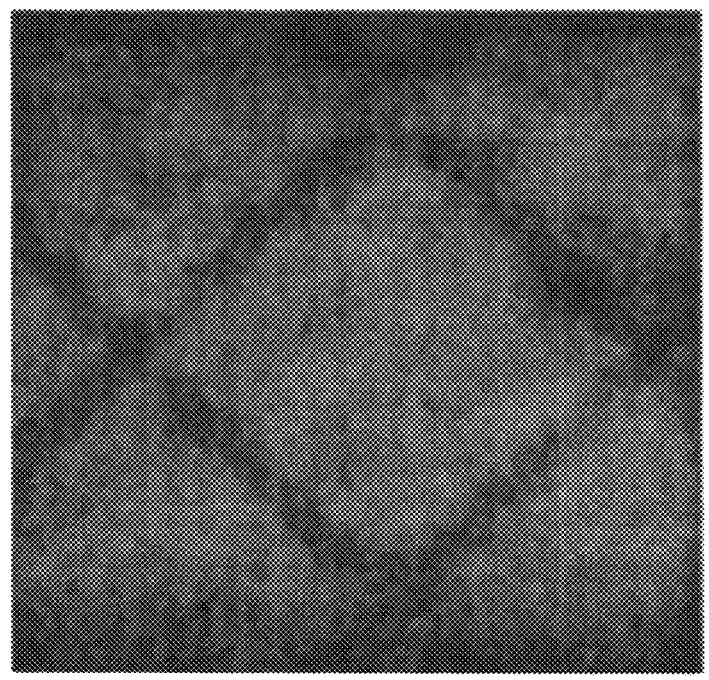
FIG. 13 illustrates (N−1)-th test sensing data generated by capturing the (N−1)-th test pattern of FIG. 12.
Figure 14:
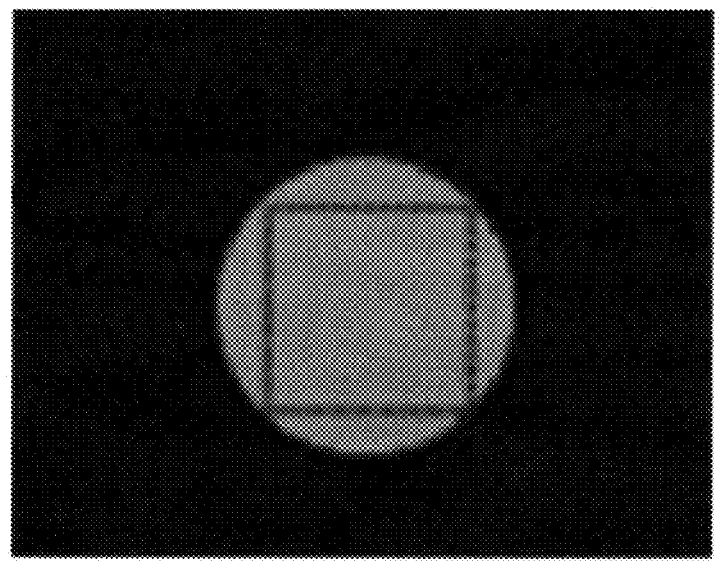
FIG. 14 illustrates an N-th test pattern to compensate the fingerprint sensing data according to the comparative example of FIG. 7.
Figure 15:
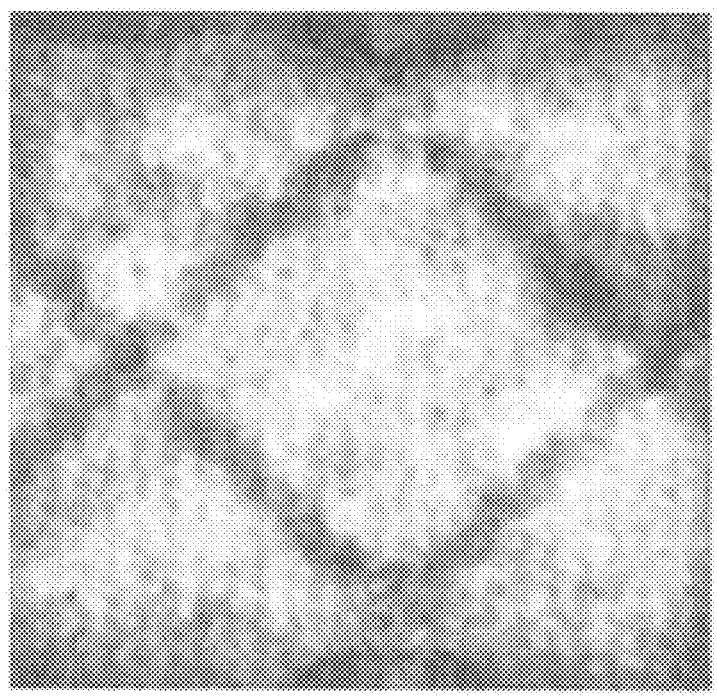
FIG. 15 illustrates N-th test sensing data generated by capturing the N-th test pattern of FIG. 14.
Figure 16:
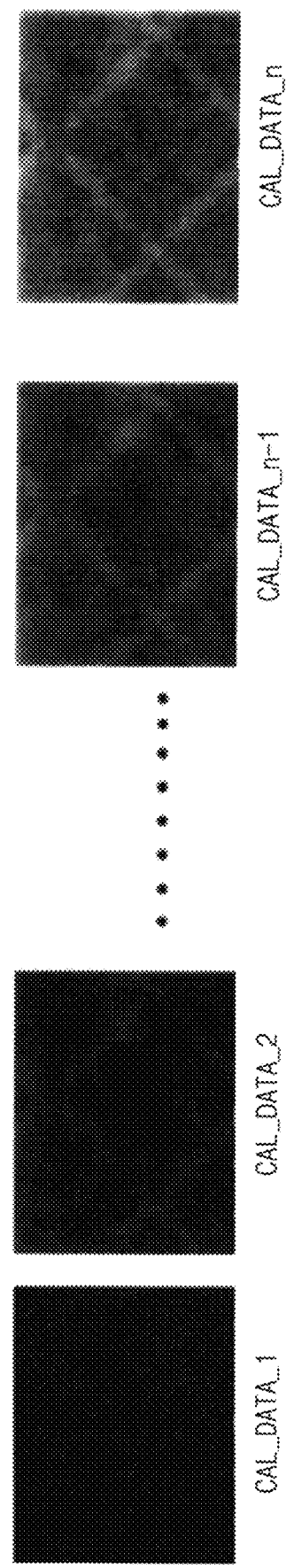
FIG. 16 illustrates first to N-th compensation data to compensate the fingerprint sensing data according to the comparative example of FIG. 7.

FIG. 7 is a flowchart diagram illustrating a method of compensating fingerprint sensing data according to a comparative example. FIG. 8 illustrates a first test patient to compensate the fingerprint sensing data according to the comparative example of FIG. 7. FIG. 9 illustrates first test sensing data generated by capturing the first test pattern of FIG. 8. FIG. 10 illustrates a second test pattern to compensate the fingerprint sensing data according to the comparative example of FIG. 7. FIG. 11 illustrates second test sensing data generated by capturing the second test pattern of FIG. 10. FIG. 12 illustrates an (N−1)-th test pattern to compensate the fingerprint sensing data according to the comparative example of FIG. 7. FIG. 13 illustrates (N−1)-th test sensing data generated by capturing the (N−1)-th test pattern of FIG. 12. FIG. 14 illustrates an N-th test pattern to compensate the fingerprint sensing data according to the comparative example of FIG. 7. FIG. 15 illustrates N-th test sensing data generated by capturing the N-th test pattern of FIG. 14. FIG. 16 illustrates first to N-th compensation data to compensate the fingerprint sensing data according to the comparative example of FIG. 7. FIG. 17 illustrates a lookup table storing an image compensation value according to the comparative example of FIG. 7.

Hereinafter, a method of compensating the fingerprint sensing data according to the comparative example is explained referring to FIGS. 7 to 17.

A step of generating the compensation data starts (step S1). A first test pattern is displayed on the fingerprint sensor FS to generate a compensation value of the fingerprint sensor FS (step S2). The first test pattern is captured by the fingerprint sensor FS (step S3). FIG. 8 represents the first test pattern. FIG. 9 represents first test sensing data generated by capturing the first test pattern. For example, the first test pattern may be a circular pattern having a first luminance. For example, the first test pattern may entirely cover a capturing area of the fingerprint sensor FS.

A second test pattern is displayed on the fingerprint sensor FS to generate the compensation value of the fingerprint sensor FS (step S4). The second test pattern is captured by the fingerprint sensor FS (step S5). FIG. 10 represents the second test pattern. FIG. 11 represents second test sensing data generated by capturing the second test pattern. For example, the second test pattern may be a circular pattern having a second luminance greater than the first luminance. For example, the second test pattern may entirely cover the capturing area of the fingerprint sensor FS.

An (n−1)-th test pattern is displayed on the fingerprint sensor FS to generate the compensation value of the fingerprint sensor FS (step S6). The (n−1)-th test pattern is captured by the fingerprint sensor FS (step S7). FIG. 12 represents the (n−1)-th test pattern. FIG. 13 represents (n−1)-th test sensing data generated by capturing the (n−1)-th test pattern. For example, the (n−1)-th test pattern may be a circular pattern having an (n−1)-th luminance greater than the second luminance. For example, the (n−1)-th test pattern may entirely cover the capturing area of the fingerprint sensor FS.

An n-th test pattern is displayed on the fingerprint sensor FS to generate the compensation value of the fingerprint sensor FS (step S8). The n-th test patient is captured by the fingerprint sensor FS (step S9). FIG. 14 represents the n-th test pattern. FIG. 15 represents n-th test sensing data generated by capturing the n-th test pattern. For example, the n-th test pattern may be a circular pattern having an n-th luminance greater than the (n−1)-th luminance. For example, the n-th test pattern may entirely cover the capturing area of the fingerprint sensor FS.

As explained above, the compensation data of the fingerprint sensor FS may be generated using the test patterns (step S10). For example, the test patterns may have substantially the same shape as each other. The test patterns may have different luminances (e.g., different grayscale values) from each other. In the present comparative example, the number of the test patterns may be n.

The compensation data of the fingerprint sensor FS may be written in the memory 700 (step S11).

For example, when a first grayscale value of the first test pattern is 0, a second grayscale value of the second test pattern is 50 and an actual grayscale value of the fingerprint sensing data is 50, then the fingerprint sensing data may be compensated using the compensation value corresponding to the second test pattern. For example, when the first grayscale value of the first test pattern is 0, the second grayscale value of the second test pattern is 50 and an actual grayscale value of the fingerprint sensing data is 30, then the fingerprint sensing data may be compensated by interpolation of the compensation value corresponding to the first test pattern and the compensation value corresponding to the second test pattern.

Thus, when the number of the test patterns increases, the amount of the compensation data increases and the accuracy of the compensation may increase.

When the number of the pixels of the fingerprint sensor FS is M and the number of the test patterns (e.g., the number of the grayscale values of the test patterns) is n, the number of image compensation values of the compensation data may be equal to M*n.

FIG. 16 represents compensation data CAL_DATA_1, CAL_DATA_2, CAL_DATA_n−1 and CAL_DATA_n respectively corresponding to the first test pattern, the second test pattern, the (n−1)-th test pattern and the n-th test pattern.

For example, a relatively bright portion in the test pattern may be relatively dark in the compensation data. For example, a relatively dark portion in the test pattern may be relatively bright in the compensation data. Thus, a sum of the fingerprint sensing data and the compensation data may have a generally uniform luminance.

As shown in FIG. 17, the first compensation data CAL_DATA_1 corresponding to the first test pattern, the second compensation data CAL_DATA_2 corresponding to the second test pattern, . . . , the (n−1)-th compensation data CAL_DATA_n−1 corresponding to the (n−1)-th test pattern, and the n-th compensation data CAL_DATA_n corresponding to the n-th test pattern for each pixel P1, P2, . . . , PM of the fingerprint sensor FS may be stored in the memory 700 in the present comparative example.

As explained above, when the number of the test pattern increases, the amount of the compensation data may proportionally increase in the present comparative example. For example, when the number of the test patterns (e.g., the number of the test grayscale values) is three and the number of the pixels of the fingerprint sensor FS is 100, then the number of the compensation values may be 300. For example, when the number of the test patterns (e.g., the number of the test grayscale values) is five and the number of the pixels of the fingerprint sensor FS is 100, then the number of the compensation values may be 500.

Figure 18:
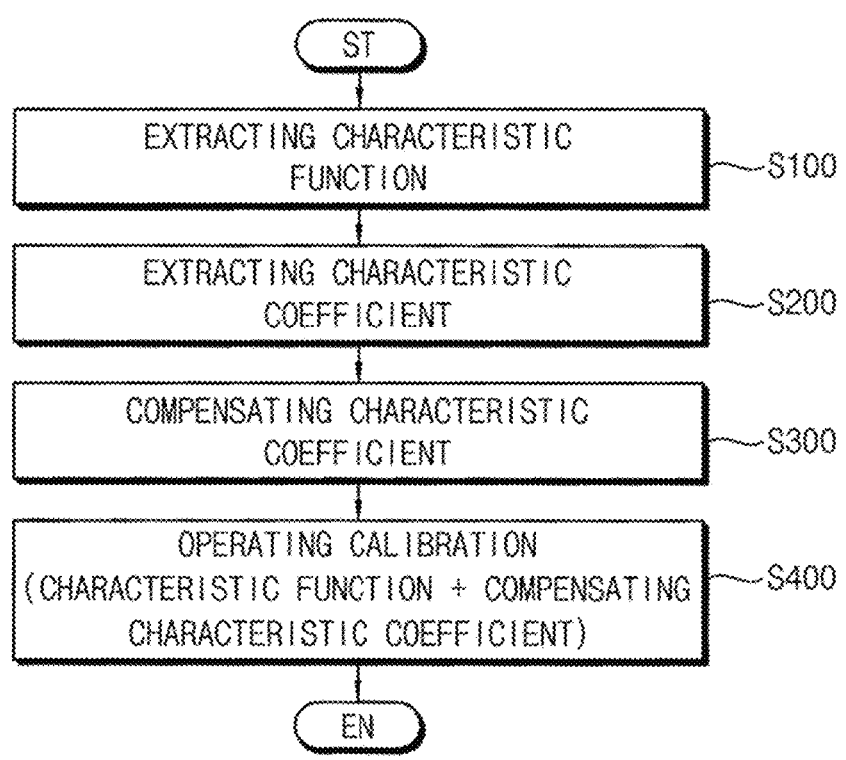
FIG. 18 is a flowchart diagram illustrating a method of compensating fingerprint sensing data using the display apparatus of FIG. 3.
Figure 19:
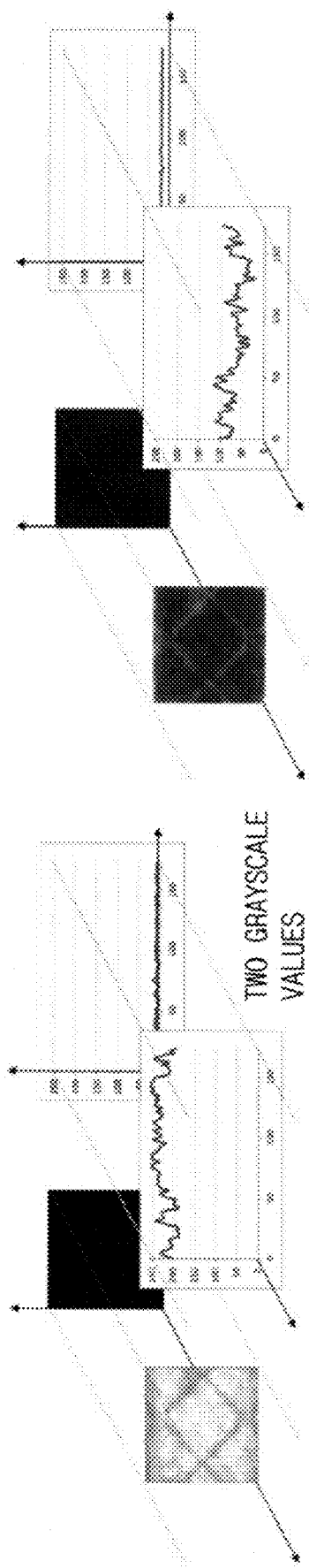
FIG. 19 illustrates a method of compensating the fingerprint sensing data using the fingerprint sensing data with two test patterns according to an exemplary embodiment of the present inventive concept.
Figure 20:
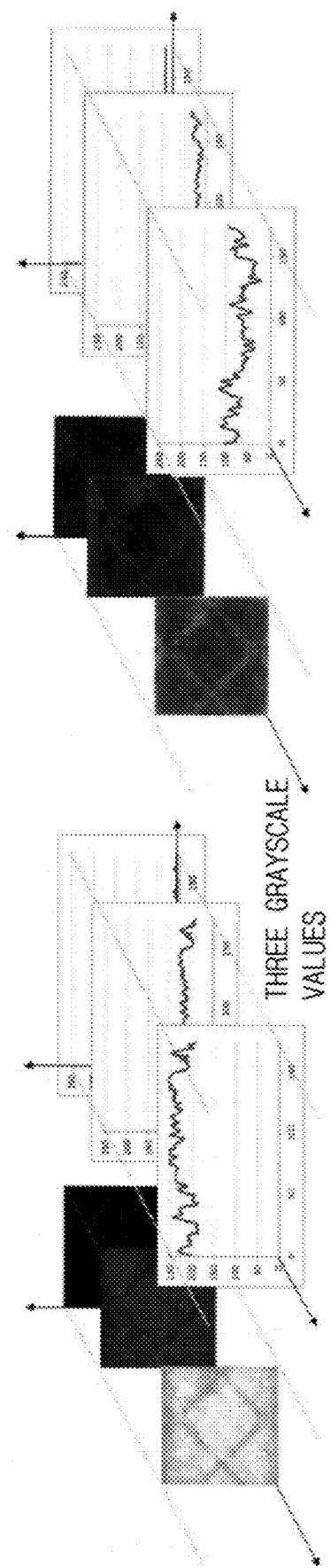
FIG. 20 illustrates a method of compensating the fingerprint sensing data using the fingerprint sensing data with three test patterns according to an exemplary embodiment of the present inventive concept.
Figure 21:
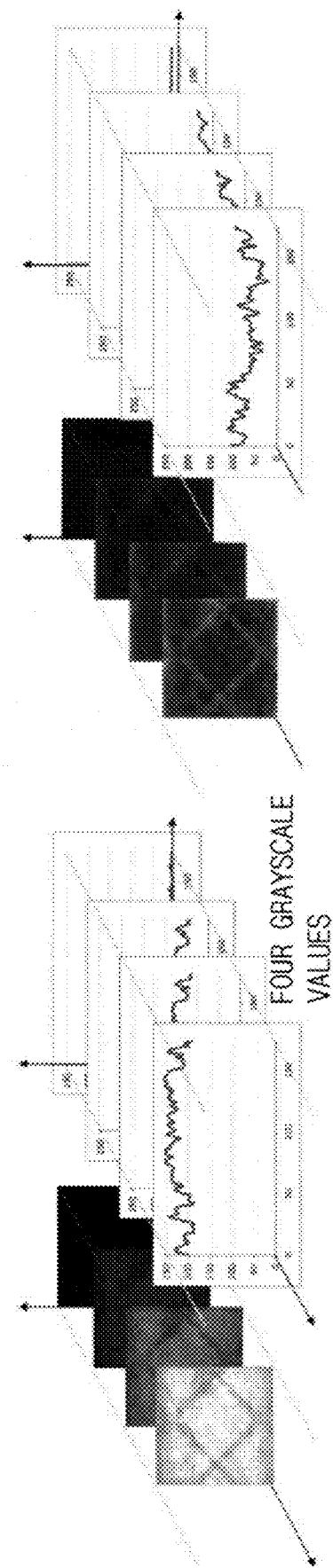
FIG. 21 illustrates a method of compensating the fingerprint sensing data using the fingerprint sensing data with four test patterns according to an exemplary embodiment of the present inventive concept.

FIG. 18 is a flowchart diagram illustrating a method of compensating fingerprint sensing data using the display apparatus of FIG. 3. FIG. 19 illustrates a method of compensating the fingerprint sensing data using the fingerprint sensing data with two test patterns according to an exemplary embodiment of the present inventive concept. FIG. 20 illustrates a method of compensating the fingerprint sensing data using the fingerprint sensing data with three test patterns according to an exemplary embodiment of the present inventive concept. FIG. 21 illustrates a method of compensating the fingerprint sensing data using the fingerprint sensing data with four test patterns according to an exemplary embodiment of the present inventive concept. FIG. 22 illustrates a characteristic function of the fingerprint sensor of FIG. 3 with four test patterns according to an exemplary embodiment of the present inventive concept. FIG. 23 illustrates a compensation characteristic function of the fingerprint sensor of FIG. 3 with four test patterns according to an exemplary embodiment of the present inventive concept. FIG. 24 illustrates a compensated characteristic function of the fingerprint sensor of FIG. 3 with four test patterns according to an exemplary embodiment of the present inventive concept. FIG. 25 illustrates an example of a lookup table storing a coefficient compensation value stored in a memory of FIG. 3 according to an exemplary embodiment of the present inventive concept.

Referring to FIGS. 1 to 3 and 18 to 25, the fingerprint sensor controller 600 may generate the compensation characteristic function of each pixel of the fingerprint sensor FS using the plurality of the test patterns (step S100). The fingerprint sensor controller 600 may extract the coefficient of the compensation characteristic function (steps S200 and S300). The fingerprint sensing data may be compensated using the coefficient of the compensation characteristic function (step S400).

In the present exemplary embodiment, the fingerprint sensor controller 600 may generate an initial characteristic function using the plurality of test patterns and may be based on the test sensing data generated by capturing the test pattern (step S100). For example, the test pattern may be captured by using the fingerprint sensor FS. The fingerprint sensor controller 600 may extract the coefficient of the initial characteristic function (step S200). The fingerprint sensor controller 600 may subtract a coefficient of the initial characteristic function of the pixel from an average value of coefficients of the initial characteristic function of all pixels of the fingerprint sensor FS to determine a coefficient of a compensation characteristic function (step S300). The coefficient of the compensation characteristic function may be stored in the memory. An actual sensing characteristic function may be extracted from the actual fingerprint sensing data. The coefficient of the compensation characteristic function may be added to a coefficient of the actual sensing characteristic function to compensate the actual fingerprint sensing data (step S400).

Unlike the above explained comparative example, although the number of the test patterns increases in the present exemplary embodiment, the amount of the information of the coefficient of the compensation characteristic function may not increase in the present exemplary embodiment. In the above explained comparative example, the compensation data may be stored as a type of image compensation data (e.g., luminance compensation data) of the fingerprint sensing data. In the present exemplary embodiment, the compensation data may be stored as a type of coefficient compensation value regarding the coefficient of the characteristic function.

In FIG. 19, the number of the test patterns is two. In FIG. 20, the number of the test patterns is three. In FIG. 21, the number of the test patterns is four.

The number of the test pattern may be equal to or greater than a degree of the compensation characteristic function. In the present exemplary embodiment, the compensation characteristic function may have a form of y=Ax+B. Herein, the memory 700 may store the coefficients A and B of the compensation characteristic function.

In the present exemplary embodiment, when the number of the pixels of the fingerprint sensor FS is M, the number of the test patterns (e.g., the number of the grayscale values of the test patterns) is n and the compensation characteristic function has a form of y=Ax+B, then the number of the coefficient compensation values of the compensation data may be 2M, which is independent of the number of the test patterns (e.g., the number of the grayscale values of the test patterns). For example, when the number of the test patterns is two as shown in FIG. 19, the number of the pixels of the fingerprint sensor FS is M, and the compensation characteristic function has a form of y=Ax+B, then the number of the coefficient compensation values may be 2M. For example, when the number of the test patterns is three as show n in FIG. 20, the number of the pixels of the fingerprint sensor FS is M, and the compensation characteristic function has a form of y=Ax+B, then the number of the coefficient compensation values may be 2M. For example, when the number of the test patterns is four as shown in FIG. 21, the number of the pixels of the fingerprint sensor FS is M, and the compensation characteristic function has a form of y=Ax+B, then the number of the coefficient compensation values may be 2M.

In FIGS. 22 to 24, the number of the test patterns is four. As illustrated in FIG. 22, relationships between a luminance of a first pixel of the fingerprint sensor FS for a first test pattern G_0, a luminance of the first pixel of the fingerprint sensor FS for a second test pattern G_1, a luminance of the first pixel of the fingerprint sensor FS for a third test pattern G_2 and a luminance of the first pixel of the fingerprint sensor FS for a fourth test pattern G_3 may be represented as an initial characteristic function (e.g., y=Ax+B) of the first pixel. In this manner, the initial characteristic functions (e.g., y=Ax+B) of all pixels of the fingerprint sensor FS may be generated. In addition, the coefficients (A and B in y=Ax+B) of the initial characteristic functions of all pixels of the fingerprint sensor FS may be extracted.

In the graph of FIG. 22, the luminances of all of the pixels are displayed by overlapping each other. As shown in FIG. 22, the characteristic variation of the fingerprint sensor FS may be greatest for the fourth test pattern G_3 when compared with the first test pattern G_0, the second test pattern G_1, and the third test pattern G_2.

As illustrated in FIG. 23, the compensation characteristic functions of all of the pixels of the fingerprint sensor FS may be determined to compensate the variation of the initial characteristic functions of all of the pixels of the fingerprint sensor FS. When the initial characteristic function has a form of y=Ax+B (a linear function), the compensation characteristic function has a form of y=Ax+B (a linear function). For example, the coefficients of the initial characteristic function may be represented as A and B and the coefficients of the compensation characteristic function may be represented as AC and BC. As a result, the compensation characteristic function may be represented as a form of y=ACx+BC. Herein, the coefficients AC and BC of the compensation characteristic function may be referred as the coefficient compensation values.

A first coefficient compensation value of the first pixel P1 may be determined by subtracting the first coefficient AC1 of the compensation characteristic function of the first pixel P1 from the average AVG(AC1~ACM) of the first coefficients of the compensation characteristic function of all of the pixels P1 to PM of the fingerprint sensor FS. A second coefficient compensation value of the first pixel P1 may be determined by subtracting the second coefficient BC1 of the compensation characteristic function of the first pixel P1 from the average AVG(BC1~BCM) of the second coefficients of the compensation characteristic function of all of the pixels P1 to PM of the fingerprint sensor FS.

A first coefficient compensation value of the second pixel P2 may be determined by subtracting the first coefficient AC2 of the compensation characteristic function of the second pixel P2 from the average AVG(AC1~ACM) of the first coefficients of the compensation characteristic function of all of the pixels P1 to PM of the fingerprint sensor FS. A second coefficient compensation value of the second pixel P2 may be determined by subtracting the second coefficient BC2 of the compensation characteristic function of the second pixel P2 from the average AVG(BC1~BCM) of the second coefficients of the compensation characteristic function of all of the pixels P1 to PM of the fingerprint sensor FS.

The memory 700 may store the first coefficient compensation values and the second coefficient compensation values of all of the pixels of the fingerprint sensor FS.

In the present exemplary embodiment, the fingerprint sensor controller 600 may generate a first characteristic function of measured fingerprint sensing data which are measured by the fingerprint sensor FS through the display panel 100. For example, the measured fingerprint sensing data may be generated from an image of a fingerprint captured by the fingerprint sensor FS. The fingerprint sensor controller 600 may generate a second characteristic function by adding the coefficient compensation values to the coefficients of the first characteristic function. The fingerprint sensor controller 600 may obtain compensated fingerprint sensing data using the second characteristic function.

The characteristic variation of the fingerprint sensor FS may be compensated by a final characteristic function that is generated by adding the coefficient compensation values to the characteristic function of the fingerprint sensing data so that the uniformity of the pixels of the fingerprint sensor FS may be increased as shown in FIG. 24.

According to the present exemplary embodiment, the image compensation value of the fingerprint sensing data may be stored as a form of the coefficient compensation value of the coefficient of the characteristic function. Thus, although the number of the test patterns to compensate the fingerprint sensing data increases, the amount of the compensation data stored in the memory 700 may not increase. Therefore, although the number of the test patterns increases to increase the reliability of the fingerprint recognition, the capacity of the memory 700 may not increase so that the manufacturing cost of the display apparatus may be reduced. In addition, although the number of the test patterns increases, the amount of the compensation data may not increase and a program time may not increase. Accordingly, the productivity of the display apparatus may be increased.

FIG. 26 illustrates an example of a lookup table storing a coefficient compensation value stored in a memory of a display apparatus according to an exemplary embodiment of the present inventive concept.

The display apparatus and the method of driving the display panel according to the present exemplary embodiment is substantially the same as the display apparatus and the method of driving the display panel of the previous exemplary embodiment explained referring to FIGS. 1 to 3 and 18 to 25 except for the characteristic function. Thus, the same reference numerals may be used to refer to the same or like pans as those described in the previous exemplary embodiment of FIGS. 1 to 3 and 18 to 25 and any repetitive explanation concerning the above elements may be omitted.

Referring to FIGS. 1 to 3, 18 to 24 and 26, the fingerprint sensor controller 600 may generate the compensation characteristic function of each pixel of the fingerprint sensor FS using the plurality of the test patterns (step S100). The fingerprint sensor controller 600 may extract the coefficient of the compensation characteristic function (steps S200 and S300). The fingerprint sensing data may be compensated using the coefficient of the compensation characteristic function (step S400).

The number of the test pattern may be equal to or greater than a degree of the compensation characteristic function. In the present exemplary embodiment, the compensation characteristic function may have a form of $y=Ax^2+Bx+C$. Herein, the memory 700 may store the coefficients A, B and C of the compensation characteristic function.

In the present exemplary embodiment, when the number of the pixels of the fingerprint sensor FS is M, the number of the test patterns (e.g., the number of the grayscale values of the test patterns) is n and the compensation characteristic function has a form of $y=Ax^2+Bx+C$, then the number of the coefficient compensation values of the compensation data may be 3M independently from the number of the test patterns (e.g., the number of the grayscale values of the test patterns). For example, when the number of the test patterns is three as shown in FIG. 20, the number of the pixels of the fingerprint sensor FS is M, and the compensation characteristic function has a form of $y=Ax^2+Bx+$, then the number of the coefficient compensation values may be 3M. As an additional example, when the number of the rest patterns is four as shown in FIG. 21, the number of the pixels of the fingerprint sensor FS is M, and the compensation characteristic function has a form of $y=Ax^2+Bx+C$, then the number of the coefficient compensation values may be 3M.

The fingerprint sensor controller 600 may generate the initial characteristic functions (e.g. $y=Ax^2+Bx+C$) of the pixels of the fingerprint sensor FS. For example, the initial characteristic functions may be generated for all of the pixels of the fingerprint sensor FS. In addition, the coefficients (A, B and C in $y=Ax^2+Bx+C$) of the initial characteristic functions of all pixels may be extracted.

The compensation characteristic functions of all of the pixels of the fingerprint sensor FS may be determined to compensate the variation of the initial characteristic functions of all of the pixels of the fingerprint sensor FS. When the initial characteristic function has a form of $y=Ax^2+Bx+C$ (e.g., a quadratic function), the compensation characteristic function has a form of $y=Ax^2+Bx+C$ (e.g., a quadratic function). For example, the coefficients of the initial characteristic function may be represented as A, B and C and the coefficients of the compensation characteristic function may be represented as AC, BC and CC. As a result, the compensation characteristic function may be represented as a form of $y=AC x^2+BC x+CC$. Herein, the coefficients AC, BC and CC of the compensation characteristic function may be referred as the coefficient compensation values.

A first coefficient compensation value of the first pixel P1 may be determined by subtracting the first coefficient AC1 of the compensation characteristic function of the first pixel P1 from the average AVG(AC1~ACM) of the first coefficients of the compensation characteristic function of all of the pixels P1 to PM of the fingerprint sensor FS. A second coefficient compensation value of the first pixel P1 may be determined by subtracting the second coefficient BC1 of the compensation characteristic function of the first pixel P1 from the average AVG(BC1~BCM) of the second coefficients of the compensation characteristic function of all of the pixels P1 to PM of the fingerprint sensor FS. A third coefficient compensation value of the first pixel P1 may be determined by subtracting the third coefficient CC1 of the compensation characteristic function of the first pixel P1 from the average AVG(CC1~CCM) of the third coefficients of the compensation characteristic function of all of the pixels P1 to PM of the fingerprint sensor FS.

The memory 700 may store the first coefficient compensation values, the second coefficient compensation values and the third coefficient compensation values of all of the pixels P1 to PM of the fingerprint sensor FS.

In the present exemplary embodiment, the fingerprint sensor controller 600 may generate a first characteristic function of measured fingerprint sensing data which is measured by the fingerprint sensor FS through the display panel 100. The fingerprint sensor controller 600 may generate a second characteristic function by adding the coefficient compensation values to the coefficients of the first characteristic function. The fingerprint sensor controller 600 may obtain compensated fingerprint sensing data using the second characteristic function. For example, image compensation values may be obtained from the compensated fingerprint sensing data.

According to the present exemplary embodiment, the image compensation value of the fingerprint sensing data may be stored as a form of the coefficient compensation value of the coefficient of the characteristic function. Thus, although the number of the test patterns to compensate the fingerprint sensing data increases, the amount of the compensation data stored in the memory 700 may not increase. Therefore, although the number of the test patterns increases to increase the reliability of the fingerprint recognition, the capacity of the memory 700 may not increase so that the manufacturing cost of the display apparatus may be reduced.

In addition, although the number of the test patterns increases, the amount of the compensation data does not increase so that a program time may not increase. Accordingly, the productivity of the display apparatus may be increased.

According to the present exemplary embodiment, the manufacturing cost of the display apparatus may be reduced and the productivity of the display apparatus may be increased.

While the present inventive concept has been described with reference to exemplary embodiments thereof, it will be understood by those of ordinary skill in the art that various changes in form and details may be made thereto without departing from the spirit and scope of the present inventive concept.

What is claimed is:

1. A display apparatus comprising:
   a display panel configured to display an image;
   a fingerprint sensor disposed on the display panel and configured to capture a fingerprint image and to generate fingerprint sensing data; and
   a fingerprint sensor controller configured to generate a compensation characteristic function of each pixel of the fingerprint sensor using a plurality of test patterns, to extract a coefficient of the compensation characteristic function of each pixel and to compensate the fingerprint sensing data using the coefficient of the compensation characteristic function.

2. The display apparatus of claim 1, further comprising a memory configured to store information including the coefficient of the compensation characteristic function of each pixel.

3. The display apparatus of claim 2, wherein as a number of the test patterns used increases, an amount of the information stored in the memory does not increase.

4. The display apparatus of claim 2, wherein a number of the test patterns is equal to or greater than a degree of the compensation characteristic function.

5. The display apparatus of claim 2, wherein the memory is configured to store a coefficient compensation value of each pixel of the fingerprint sensor,
   wherein a coefficient compensation value of a first pixel of the fingerprint sensor is determined by subtracting a coefficient of the compensation characteristic function of the first pixel from an average of coefficients of the compensation characteristic functions of all of the pixels of the fingerprint sensor.

6. The display apparatus of claim 5, wherein the fingerprint sensor controller is configured to generate a first characteristic function of measured fingerprint sensing data, to generate a second characteristic function by adding the coefficient compensation value of each pixel to the coefficient of the first characteristic function and to obtain compensated fingerprint sensing data using the second characteristic function, wherein the fingerprint sensing data is measured by the fingerprint sensor.

7. The display apparatus of claim 5, wherein the compensation characteristic function has a form of $y=Ax+B$.

8. The display apparatus of claim 7, wherein a first coefficient compensation value of the first pixel of the fingerprint sensor is determined by subtracting "A" of the first pixel from an average value of "A" of all of the pixels of the fingerprint sensor,
   wherein a second coefficient compensation value of the first pixel is determined by subtracting "B" of the first pixel from an average value of "B" of all of the pixels of the fingerprint sensor, and
   wherein the memory is configured to store the first coefficient compensation values of all of the pixels of the fingerprint sensor and the second coefficient compensation values of all of the pixels of the fingerprint sensor.

9. The display apparatus of claim 7, wherein a number of the pixels of the fingerprint sensor is M, and a number of the coefficient compensation values is 2M, wherein the number of the coefficient compensation values is independent from a number of the test patterns.

10. The display apparatus of claim 5, wherein the compensation characteristic function has a form of $y=Ax^2+Bx+C$.

11. The display apparatus of claim 10, wherein a first coefficient compensation value of the first pixel of the fingerprint sensor is determined by subtracting "A" of the first pixel from an average value of "A" of all of the pixels of the fingerprint sensor,
   wherein a second coefficient compensation value of the first pixel is determined by subtracting "B" of the first pixel from an average value of "B" of all of the pixels of the fingerprint sensor,
   wherein a third coefficient compensation value of the first pixel is determined by subtracting "C" of the first pixel from an average value of "C" of all of the pixels of the fingerprint sensor, and
   wherein the memory is configured to store the first coefficient compensation values of all of the pixels of the fingerprint sensor, the second coefficient compensation values of all of the pixels of the fingerprint sensor and the third coefficient compensation values of all of the pixels of the fingerprint sensor.

12. The display apparatus of claim 10, wherein a number of the pixels of the fingerprint sensor is M, and a number of the coefficient compensation values is 3M, wherein the number of the coefficient compensation values is independent from a number of the test patterns.

13. A method of compensating fingerprint sensing data, the method comprising:
   capturing a plurality of test patterns using a fingerprint sensor, wherein the plurality of test patterns are used to generate test sensing data;
   generating a compensation characteristic function of each pixel of the fingerprint sensor using the test sensing data;
   extracting a coefficient of the compensation characteristic function;
   capturing a plurality of fingerprint images using the fingerprint sensor, wherein the plurality of fingerprint images are used to generate fingerprint sensing data; and
   compensating the fingerprint sensing data using the coefficient of the compensation characteristic function.

14. The method of claim 13, further comprising storing information including the coefficient of the compensation characteristic function in a memory.

15. The method of claim 14, wherein as a number of the test patterns used increases, an amount of the information stored in the memory does not increase.

16. The method of claim 14, wherein a number of the test patterns is equal to or greater than a degree of the compensation characteristic function.

17. The method of claim 14, wherein the memory is configured to store a coefficient compensation value of each pixel of the fingerprint sensor,
   wherein a coefficient compensation value of a first pixel of the fingerprint sensor is determined by subtracting a coefficient of the compensation characteristic function of the first pixel from an average of coefficients of the compensation characteristic functions of all of the pixels of the fingerprint sensor.

18. The method of claim 17, wherein compensating the fingerprint sensing data comprises:
generating a first characteristic function of measured fingerprint sensing data, wherein the fingerprint sensing data is measured by the fingerprint sensor,
generating a second characteristic function by adding the coefficient compensation value of each pixel to the coefficient of the first characteristic function; and
obtaining compensated fingerprint sensing data using the second characteristic function.

19. The method of claim 17, wherein the compensation characteristic function has a form of y=Ax+B.

20. The method of claim 19, wherein a first coefficient compensation value of the first pixel of the fingerprint sensor is determined by subtracting "A" of the first pixel from an average value of "A" of all of the pixels of the fingerprint sensor,
wherein a second coefficient compensation value of the first pixel is determined by subtracting "B" of the first pixel from an average value of "B" of all of the pixels of the fingerprint sensor, and
wherein the memory is configured to store the first coefficient compensation values of all of the pixels of the fingerprint sensor and the second coefficient compensation values of all of the pixels of the fingerprint sensor.

* * * * *